(12) United States Patent
Counterman (10) Patent No.: US 10,341,862 B2
(45) Date of Patent: Jul. 2, 2019

(54) AUTHENTICATING MOBILE DEVICES

(71) Applicant: Verizon Patent and Licensing Inc., Arlington, VA (US)

(72) Inventor: Raymond C. Counterman, Canton, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 183 days.

(21) Appl. No.: 15/016,717

(22) Filed: Feb. 5, 2016

(65) Prior Publication Data

US 2017/0230825 A1    Aug. 10, 2017

(51) Int. Cl.
*H04L 29/06* (2006.01)
*H04W 12/06* (2009.01)

(52) U.S. Cl.
CPC ......... *H04W 12/06* (2013.01); *H04L 63/0807* (2013.01); *H04L 63/0876* (2013.01)

(58) Field of Classification Search
CPC .... H04W 12/06; H04L 63/0815; H04L 9/321; H04L 9/3213; H04L 63/0807; H04L 63/0876
USPC ......................................................... 713/159
See application file for complete search history.

(56) References Cited

U.S. PATENT DOCUMENTS

| | | | | |
|---|---|---|---|---|
| 2002/0133467 | A1* | 9/2002 | Hobson | G06Q 20/02 705/64 |
| 2007/0118890 | A1* | 5/2007 | Song | H04L 63/0815 726/8 |
| 2007/0245414 | A1* | 10/2007 | Chan | H04L 63/0823 726/12 |
| 2013/0054968 | A1* | 2/2013 | Gupta | H04L 63/0428 713/168 |
| 2013/0086670 | A1* | 4/2013 | Vangpat | H04L 9/3213 726/8 |
| 2013/0097686 | A1* | 4/2013 | Towata | G06F 21/31 726/9 |
| 2013/0191884 | A1* | 7/2013 | Leicher | H04L 63/08 726/4 |
| 2015/0128242 | A1* | 5/2015 | Hoy | H04L 63/0884 726/9 |
| 2016/0044511 | A1* | 2/2016 | Broch | H04W 12/06 726/4 |

(Continued)

OTHER PUBLICATIONS

The OAuth 2.0 Authorization Framework, D. Hardt Oct. 2012 (Year: 2012).*

(Continued)

*Primary Examiner* — Alexander Lagor
*Assistant Examiner* — Vu V Tran (57) ABSTRACT

A device may receive an encrypted authorization request token from a mobile device. The encrypted authorization request token may be based on at least one parameter and may have been created by a third party device. The device may decrypt the encrypted authorization request token to obtain the at least one parameter. The device may determine, based on an address for the mobile device, a mobile device identifier for the mobile device. The device may create an identification token for the mobile device. The identification token may be based on the mobile device identifier and the at least one parameter. The device may send the identification token to at least one of the mobile device or the third party device to permit the third party device to authenticate the mobile device.

20 Claims, 6 Drawing Sheets

(56) References Cited

U.S. PATENT DOCUMENTS

2016/0366122 A1* 12/2016 Rykowski ............. H04W 12/06
2017/0288937 A1* 10/2017 Zhang .................... H04L 29/06

OTHER PUBLICATIONS

Recommendation Based Open Authorization, Mohamed Shehab et al. (Year: 2011).*
Sakimura et al., "OpenID Connect Basic Client Implementer's Guide 1.0—draft 37", http://openid.net/specs/openid-connect-basic-1_0.html, Aug. 3, 2015, 33 pages.
Sakimura et al., "OpenID Connect Implicit Client Implementer's Guide 1.0—draft 20", http://openid.net/specs/openid-connect-implicit-1_0.html, Aug. 3, 2015, 32 pages.
Sakimura et al., "OpenID Connect Core 1.0 incorporating errata set 1", Nov. 8, 2014, 92 pages.
Hardt, "The OAuth 2.0 Authorization Framework", Internet Engineering Task Force (IETF), Standards Track, http://tools.ietf.org/html/rfc6749, Oct. 2012, 76 pages.
Jones et al., "JSON Web Token (JWT)", Internet Engineering Task Force (IETF), Standards Track, http://tools.ietf.org/html/rfc7519", May 2015, 30 pages.

* cited by examiner

AUTHENTICATING MOBILE DEVICES

BACKGROUND

Wireless network operators may authenticate mobile devices that are attached to the operators' wireless networks. The wireless network operators may provide authentication information regarding the mobile devices to third parties, such as customers of the wireless network operators and/or identity aggregators. The third parties may use the authentication information for the third parties' own applications and/or to provide authentication services to other parties.

DETAILED DESCRIPTION OF PREFERRED EMBODIMENTS

The following detailed description of example implementations refers to the accompanying drawings. The same reference numbers in different drawings may identify the same or similar elements.

Providing authentication services (e.g., to a third party) for authenticating mobile devices attached to a wireless network may require secured communications between the mobile devices, the network devices providing the authentication services, and/or the third party devices that request and/or receive the authentication services. To obtain secure communications, some processes for authenticating mobile devices may establish a secure communication session, such as a secure session based on hypertext transfer protocol (HTTP) within a connection encrypted by transport layer security (TLS) or secure sockets layer (SSL) (e.g., an HTTPS session). However, the latencies involved in setting up a secure communication session (e.g., an HTTPS session) may result in slower than desired authentication services. Implementations described herein may use encrypted messages to provide secured communications for at least some portions of the authentication process, which may allow authentication process communications to be securely sent using unsecured communication pathways (e.g., over HTTP).

Although the implementations described herein may use unsecured communications (e.g., communication over HTTP) for at least some portions of the authentication process, the described implementations may alternatively use secured communications (e.g., communication over HTTPS) for at least some portions of the authentication process. Thus, references herein to use of unsecured communication (e.g., using HTTP) in a given situation should be understood as alternatively permitting use of secured communication (e.g., an HTTPS session) in that situation.

Although generally described in the context of authenticating mobile devices, the implementations described herein may also be applicable to authenticating users and/or applications (e.g., apps) that are associated with mobile devices.

Figure 1A:
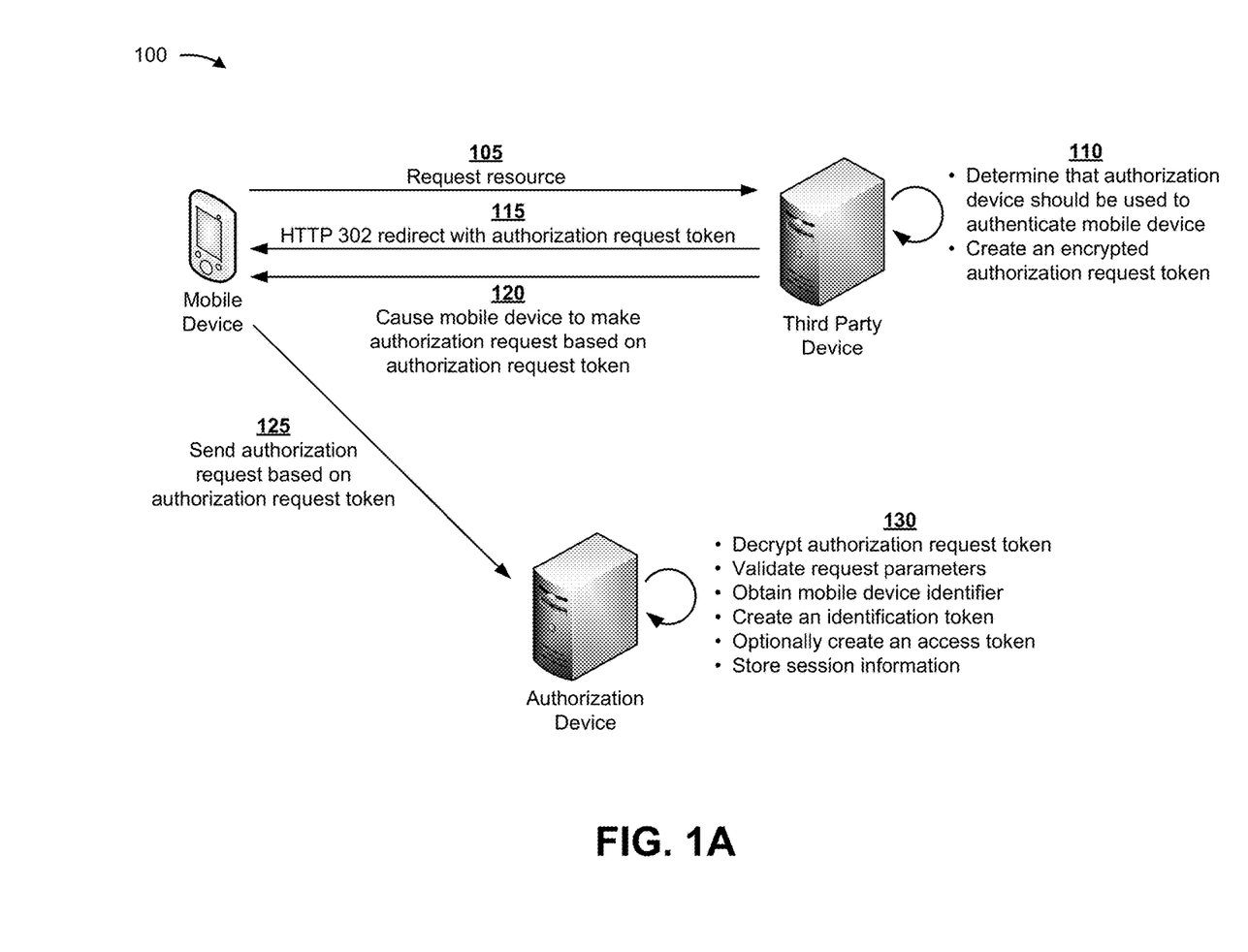
FIGS. 1A-1C are diagrams of an overview of an example implementation described herein.
Figure 1B:
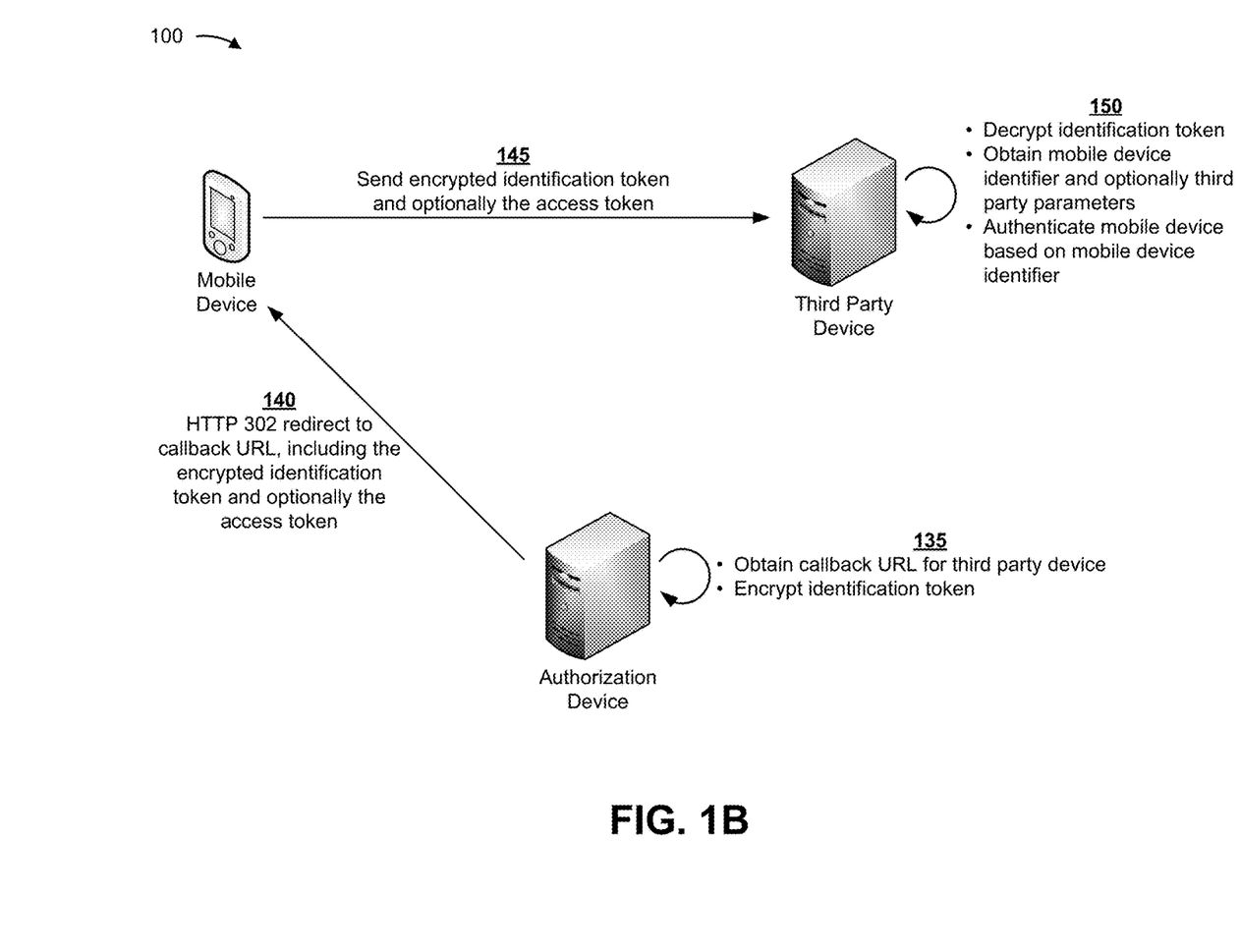
Figure 1C:
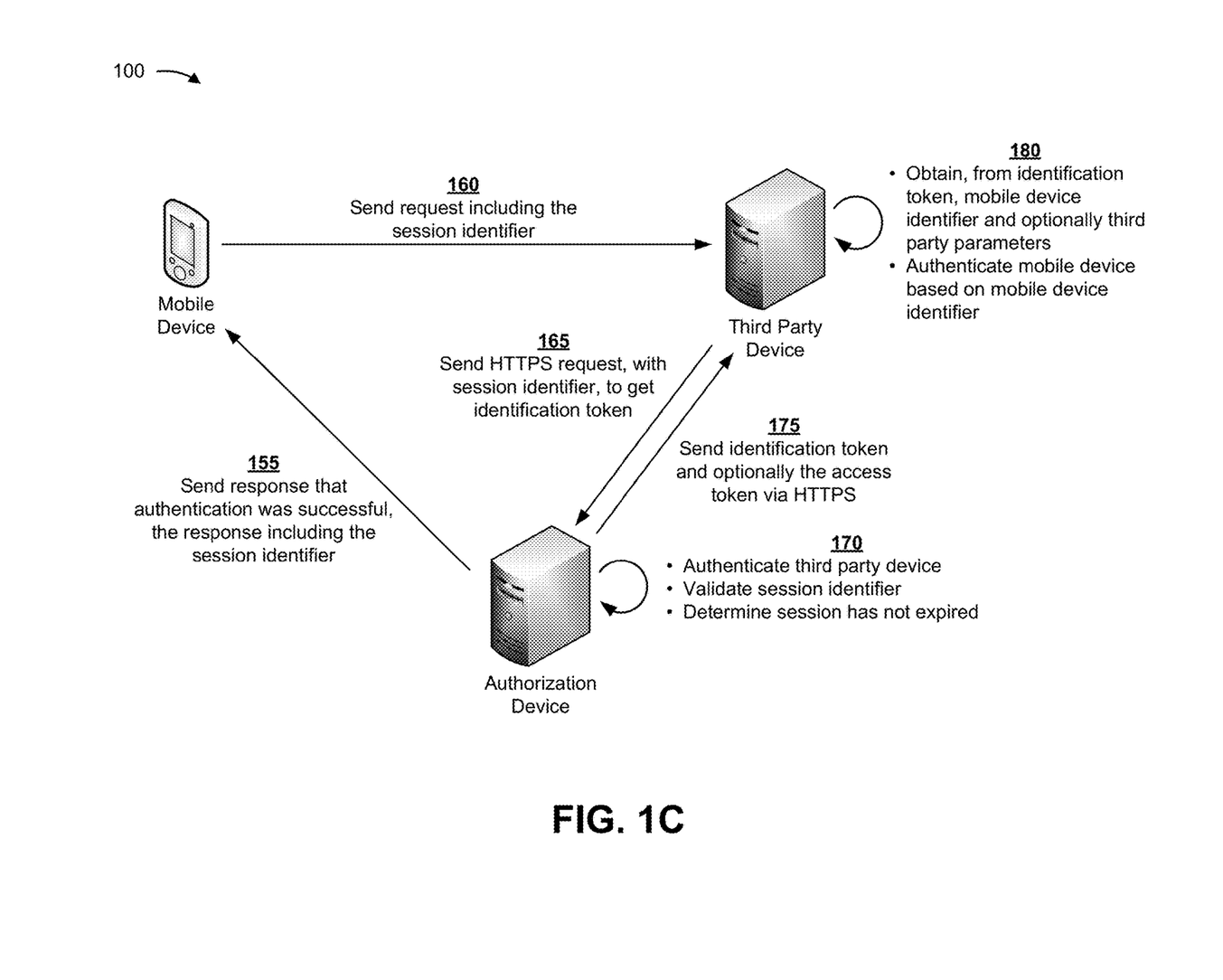

FIGS. 1A-1C are diagrams of an overview of an example implementation 100 described herein. As shown in FIG. 1A, assume that a mobile device is attached to a wireless network and seeks to obtain content and/or services from a third party device (e.g., a web and/or app server). Further assume that an authorization device is associated with the wireless network to which the mobile device is attached (e.g., the mobile device is on the wireless network associated with the authorization device).

As shown by reference number 105, the mobile device may request a resource from the third party device. As shown by reference number 110, the third party device may determine that the authorization device should be used to authenticate the mobile device. As further shown by reference number 110, the third party device may create an encrypted authorization request token, which may be based on request parameters (including a session identifier) and optionally third party parameters (e.g., parameters that a third party desires to have passed through the authentication process). As shown by reference number 115, in some implementations, the third party device may send, to the mobile device, an HTTP 302 redirect with the authorization request token. Alternatively, the third party device may, in some implementations, send a message (e.g., a JavaScript authorization request) to cause the mobile device to make an authorization request based on the authorization request token, as shown by reference number 120. Based on the HTTP 302 redirect (reference number 115) or based on the message from the third party device (reference number 120), the mobile device may send, to the authorization device, an authorization request based on the authorization request token, as shown by reference number 125.

As shown by reference number 130, the authorization device may decrypt the authorization request token, validate the request parameters from the decrypted authorization request token, and obtain a mobile device identifier (e.g., a mobile device number (MDN), an international mobile subscriber identity (IMSI), or a temporary mobile subscriber identity (TMSI)) for the mobile device. The authorization device may create an identification token, which may be based on the mobile device identifier, the request parameters (including the session identifier), and optionally the third party parameters (if included in the authorization request token). As further shown by reference number 130, the authorization device may optionally create an access token. The authorization device may store session information (e.g., data relating to an authentication session that is identified by the session identifier).

As shown in FIG. 1B, assume that the request parameters include a callback uniform resource locator (URL) for the third party device. As shown by reference number 135, the authorization device may obtain the callback URL for the third party device (e.g., from the request parameters). As further shown by reference number 135, the authorization device may encrypt the identification token. The authorization device may also encrypt the access token (if the access token was created). As shown by reference number 140, the authorization device may send, to the mobile device, an HTTP 302 redirect to the callback URL that includes the encrypted identification token and optionally the access token. As shown by reference number 145, the mobile device may send, to the third party device, the encrypted identification token and optionally the access token.

As shown by reference number 150, the third party device may decrypt the identification token and obtain, from the decrypted identification token, the mobile device identifier and optionally the third party parameters. As further shown by reference number 150, the third party device may authenticate the mobile device based on the mobile device identifier.

As shown in FIG. 1C, assume that the request parameters did not include a callback URL. As shown by reference number 155, the authorization device may send, to the mobile device, a response indicating that authentication of the mobile device was successful, with the response including the session identifier. As shown by reference number 160, the mobile device may send, to the third party device, a request including the session identifier. As shown by reference number 165, the third party device may send, to the authorization device, an HTTPS request, with the session identifier, to get the identification token for the mobile device.

As shown by reference number 170, the authorization device may authenticate the third party device, validate the session identifier, and determine that the session has not expired. As shown by reference number 175, the authorization device may send, to the third party device via HTTPS, the identification token and optionally the access token. As shown by reference number 180, the third party device may obtain, from the identification token, the mobile device identifier and optionally the third party parameters. As further shown by reference number 180, the third party device may authenticate the mobile device based on the mobile device identifier.

In this way, a wireless network operator may use encrypted tokens to provide secure communications while authenticating a mobile device (e.g., for a third party) and to optionally pass third party parameters through the authentication process. Using encrypted tokens to provide secure communications may permit mobile device authentication with reduced use of secure communication sessions (e.g., may permit using HTTP instead of HTTPS for some parts of the authentication process). Thus, implementations described herein may reduce latencies (e.g., latencies involved in setting up secure communication sessions) associated with mobile device authentication. Implementations described herein may additionally, or alternatively, reduce consumption of network resources that would otherwise be needed to set up secure communication sessions (e.g., HTTPS sessions) for the authentication process. In some implementations, passing third party parameters through the authentication process may allow third parties to more easily integrate the authentication services into the third parties' offerings because the third parties may selectively pass desired third party parameters through the authentication process (e.g., to support the third parties' own processes).

As indicated above, FIGS. 1A-1C are provided merely as an example. Other examples are possible and may differ from what was described with regard to FIGS. 1A-1C.

Figure 2:
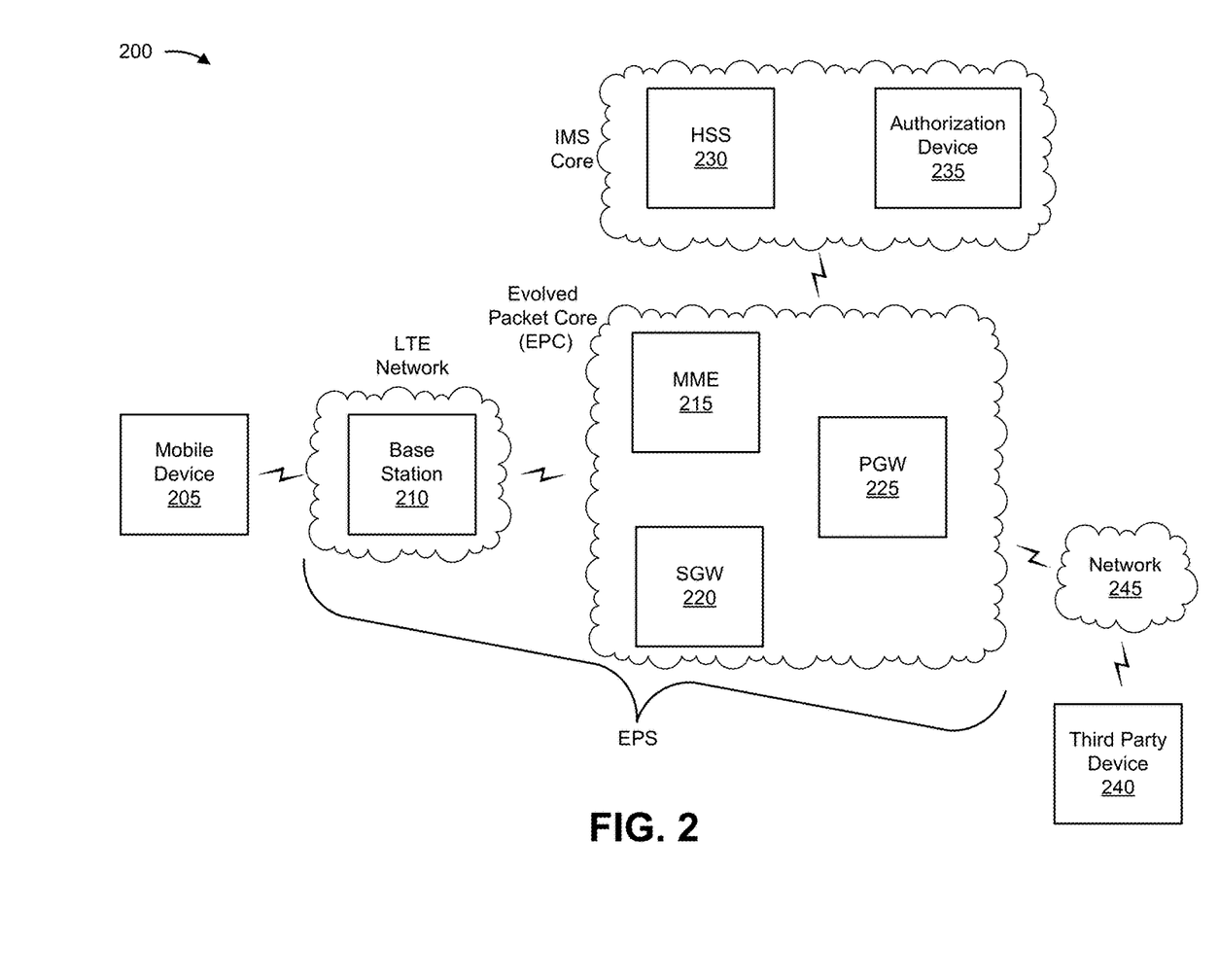
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a mobile device 205; a base station 210; a mobility management entity device (MME) 215; a serving gateway (SGW) 220; a packet data network gateway (PGW) 225; a home subscriber server (HSS) 230; an authorization device 235; a third party device 240; and a network 245. Devices of environment 200 may interconnect via wired connections, wireless connections, or a combination of wired and wireless connections.

Some implementations are described herein as being performed within a long term evolution (LTE) network for explanatory purposes. Some implementations may be performed within a network that is not an LTE network, such as a third generation (3G) network.

Environment 200 may include an evolved packet system (EPS) that includes an LTE network and/or an evolved packet core (EPC) that operate based on a third generation partnership project (3GPP) wireless communication standard. The LTE network may include a radio access network (RAN) that includes one or more base stations 210 that take the form of evolved Node Bs (eNBs) via which mobile device 205 communicates with the EPC. The EPC may include MME 215, SGW 220, and/or PGW 225 that enable mobile device 205 to communicate with network 245 and/or an Internet protocol (IP) multimedia subsystem (IMS) core. The IMS core may include HSS 230 and/or authorization device 235, and may manage device registration and authentication, session initiation, etc., associated with mobile devices 205. HSS 230 and/or authorization device 235 may reside in the EPC and/or the IMS core.

Mobile device 205 includes one or more devices capable of communicating with base station 210 and/or a network (e.g., network 245). For example, mobile device 205 may include a wireless communication device, a radiotelephone, a personal communications system (PCS) terminal (e.g., that may combine a cellular radiotelephone with data processing and data communications capabilities), a smart phone, a laptop computer, a tablet computer, a personal gaming system, a wearable communication device (e.g., a pair of smart eyeglasses or a smart watch), a machine device, and/or a similar device. Mobile device 205 may send traffic to and/or receive traffic from network 245 (e.g., via base station 210, SGW 220, and/or PGW 225).

Base station 210 includes one or more devices capable of transferring traffic, such as audio, video, text, and/or other traffic, destined for and/or received from mobile device 205. In some implementations, base station 210 may include an eNB associated with the LTE network that receives traffic from and/or sends traffic to network 245 via SGW 220 and/or PGW 225. Additionally, or alternatively, one or more base stations 210 may be associated with a radio access network that is not associated with the LTE network. Base station 210 may send traffic to and/or receive traffic from mobile device 205 via an air interface. In some implementations, base station 210 may include a small cell base station, such as a base station of a microcell, a picocell, and/or a femtocell.

MME 215 includes one or more devices, such as one or more server devices, capable of managing authentication, activation, deactivation, and/or mobility functions associated with mobile device 205. In some implementations, MME 215 may perform operations relating to authentication of mobile device 205. Additionally, or alternatively, MME 215 may facilitate the selection of a particular SGW 220 and/or a particular PGW 225 to serve traffic to and/or from mobile device 205. MME 215 may perform operations associated with handing off mobile device 205 from a first base station 210 to a second base station 210 when mobile device 205 is transitioning from a first cell associated with the first base station 210 to a second cell associated with the second base station 210. Additionally, or alternatively, MME 215 may select another MME (not pictured), to which mobile device 205 should be handed off (e.g., when mobile device 205 moves out of range of MME 215).

SGW 220 includes one or more devices capable of routing packets. For example, SGW 220 may include one or more data processing and/or traffic transfer devices, such as a gateway, a router, a modem, a switch, a firewall, a network interface card (NIC), a hub, a bridge, a server device, an optical add/drop multiplexer (OADM), or any other type of device that processes and/or transfers traffic. In some implementations, SGW 220 may aggregate traffic received from one or more base stations 210 associated with the LTE network, and may send the aggregated traffic to network 245 (e.g., via PGW 225) and/or other network devices associated with the EPC and/or the IMS core. SGW 220 may also receive traffic from network 245 and/or other network devices, and may send the received traffic to mobile device 205 via base station 210. Additionally, or alternatively, SGW 220 may perform operations associated with handing off mobile device 205 to and/or from an LTE network.

PGW 225 includes one or more devices capable of providing connectivity for mobile device 205 to external packet data networks (e.g., other than the depicted EPC and/or LTE network). For example, PGW 225 may include one or more data processing and/or traffic transfer devices, such as a gateway, a router, a modem, a switch, a firewall, a NIC, a hub, a bridge, a server device, an OADM, or any other type of device that processes and/or transfers traffic. In some implementations, PGW 225 may aggregate traffic received from one or more SGWs 220, and may send the aggregated traffic to network 245. Additionally, or alternatively, PGW 225 may receive traffic from network 245, and may send the traffic to mobile device 205 via SGW 220 and base station 210. PGW 225 may record data usage information (e.g., byte usage), and may provide the data usage information to authorization device 235. In some implementations, PGW 225 may create a binding between mobile device 205's address (e.g., a network address, such as an IP address) and mobile device 205's mobile device identifier (e.g., MDN, IMSI, or TMSI). In some implementations, the binding between mobile device 205's address and mobile device identifier may be included in pilot packets and may be stored in a suitable data structure (e.g., a pilot packet database).

HSS 230 includes one or more devices, such as one or more server devices, capable of managing (e.g., receiving, generating, storing, processing, and/or providing) information associated with mobile device 205. For example, HSS 230 may manage subscription information associated with mobile device 205, such as information that identifies a subscriber profile of a user associated with mobile device 205, information that identifies services and/or applications that are accessible to mobile device 205, location information associated with mobile device 205, a network identifier (e.g., a network address, such as an IP address) that identifies mobile device 205, information that identifies a treatment of mobile device 205 (e.g., quality of service information, a quantity of minutes allowed per time period, or a quantity of data consumption allowed per time period), and/or similar information. HSS 230 may provide this information to one or more other devices of environment 200 to support the operations performed by those devices.

Authorization device 235 includes one or more devices, such as one or more server devices, capable of receiving, generating, storing, searching, processing, and/or providing information in a manner similar to that described herein. For example, authorization device 235 may perform authentication operations with regard to mobile device 205 and/or a user of mobile device 205. In some implementations, authorization device 235 may perform authentication operations in response to a request received from mobile device 205, third party device 240, and/or from another device. In some implementations, authorization device 235 may store session information associated with the authentication operations, and may generate a response indicating whether the authentication operations were successful or unsuccessful. In some implementations, authorization device 235 may send information based on authentication operations to mobile device 205, third party device 240, and/or another device.

In some implementations, authorization device 235 may be or include an authentication, authorization, and accounting server (AAA), which may perform authentication, authorization, and/or accounting operations for communication sessions associated with mobile device 205. For example, authorization device 235 may control access, by mobile device 205, to a service and/or an application (e.g., based on one or more restrictions, such as time-of-day restrictions, location restrictions, single or multiple access restrictions, or read/write restrictions), may track resources consumed by mobile device 205 (e.g., a quantity of voice minutes consumed or a quantity of data consumed), and/or may perform similar operations.

Third party device 240 includes one or more devices, such as one or more server devices (e.g., a content server, a host server, a web server, an application server, a database server, a voice portal server, a payment processing server, or a credit card processing server), capable of receiving, generating, storing, processing, and/or providing information associated with a third party service (e.g., an application or app with a back end supported by third party device 240) and/or third party content. In some implementations, third party device 240 may provide access to a third party service and/or to third party content. In some implementations, when mobile device 205 attempts to access services and/or content through third party device 240, third party device 240 may request, or may cause mobile device 205 to request, authentication services (e.g., from authorization device 235) with regard to mobile device 205 and/or a user of mobile device 205. In some implementations, third party device 240 may be affiliated with an identity aggregator and/or a third party authentication service provider.

Network 245 includes one or more wired and/or wireless networks. For example, network 245 may include a cellular network (e.g., an LTE network, a 3G network, a code division multiple access (CDMA) network, etc.), a public land mobile network (PLMN), a wireless local area network (e.g., a Wi-Fi network), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
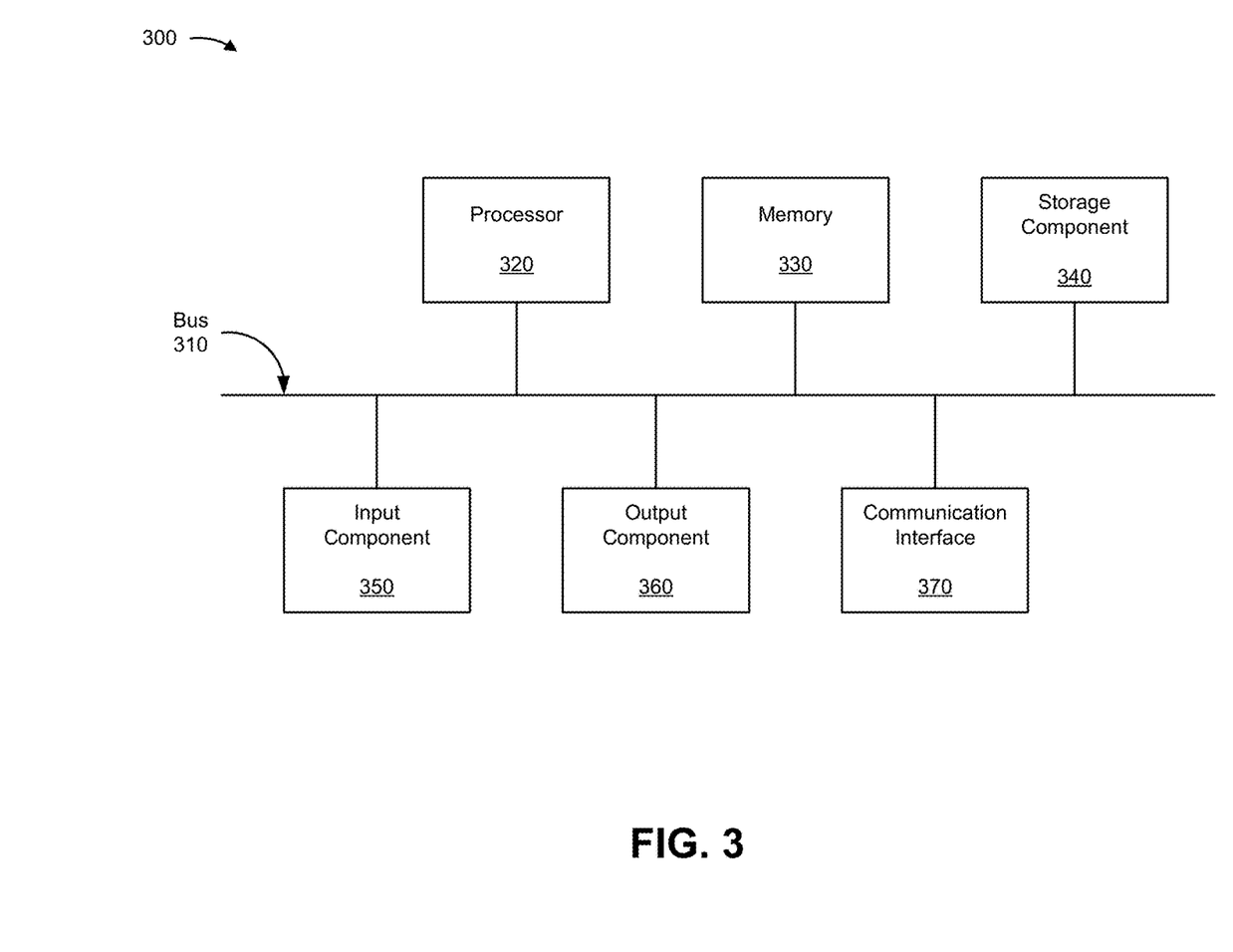
FIG. 3 is a diagram of example components of one or more devices of FIG. 2.

FIG. 3 is a diagram of example components of a device 300. Device 300 may correspond to mobile device 205, base station 210, MME 215, SGW 220, PGW 225, HSS 230, authorization device 235, and/or third party device 240. In some implementations, mobile device 205, base station 210, MME 215, SGW 220, PGW 225, HSS 230, authorization device 235, and/or third party device 240 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 includes a processor (e.g., a central processing unit (CPU), a graphics processing unit (GPU), an accelerated processing unit (APU), etc.), a microprocessor, and/or any processing component (e.g., a field-programmable gate array (FPGA) or an application-specific integrated circuit (ASIC)) that interprets and/or executes instructions. In some implementations, processor 320 may include one or more processors capable of being programmed to perform a function. Memory 330 includes a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, or a microphone). Additionally, or alternatively, input component 350 may include a sensor for sensing information (e.g., a global positioning system (GPS) component, an accelerometer, a gyroscope, or an actuator). Output component 360 includes a component that provides output information from device 300 (e.g., a display, a speaker, or one or more light-emitting diodes (LEDs)).

Communication interface 370 includes a transceiver-like component (e.g., a transceiver or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
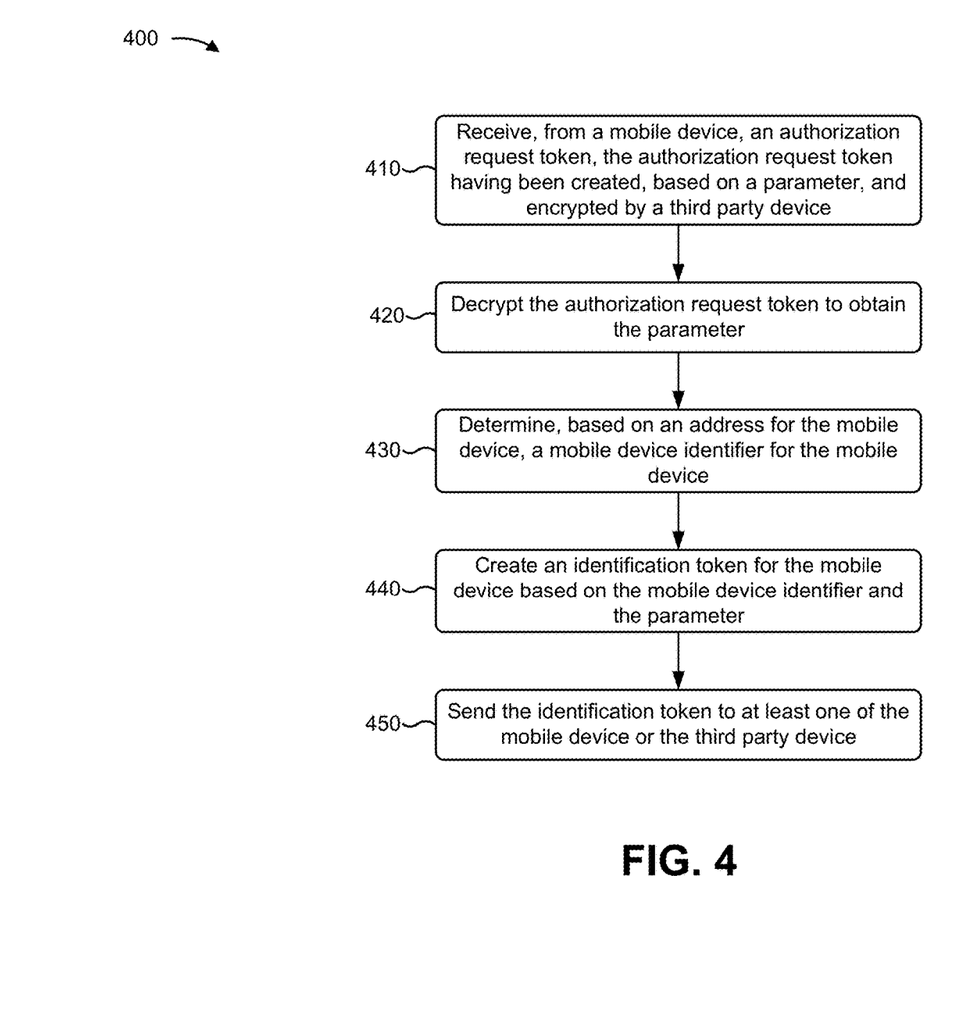
FIG. 4 is a flow chart of an example process for authenticating mobile devices.

FIG. 4 is a flow chart of an example process 400 for authenticating mobile devices. In some implementations, one or more process blocks of FIG. 4 may be performed by authorization device 235. In some implementations, one or more process blocks of FIG. 4 may be performed by another device or a group of devices separate from or including authorization device 235, such as mobile device 205, base station 210, MME 215, SGW 220, PGW 225, HSS 230, and/or third party device 240.

As shown in FIG. 4, process 400 may include receiving, from a mobile device, an authorization request token, the authorization request token having been created, based on a parameter, and encrypted by a third party device (block 410). For example, authorization device 235 may receive, from mobile device 205, an authorization request token that was created based on a parameter. The authorization request token may have been created and encrypted by third party device 240.

In some implementations, third party device 240 may receive, from mobile device 205, a request for a resource (e.g., to receive service or content). Based on the request, third party device 240 may determine that mobile device 205 is attached to the wireless network associated with authorization device 235, such that third party device 240 may determine that authorization device 235 should be used to authenticate mobile device 205.

Prior to authenticating mobile device 205, authorization device 235 and third party device 240 may exchange information for use in support of the authentication process. In some implementations, an entity operating authorization device 235 (e.g., the wireless network operator) may exchange the information with an entity operating third party device 240 (e.g., a third party, which may be a customer of the wireless network operator). For example, authorization device 235 may receive (e.g., from third party device 240 and/or from the third party) one or more callback URLs.

Third party device 240 may be assigned and/or receive (e.g., from authorization device 235 and/or the wireless network operator) a third party identifier (e.g., for identifying third party device 240), a third party secret, and a set of shared secrets (e.g., shared security keys or an appropriate combination of public-private key pairs). As will be more fully discussed below, the set of shared secrets may be used for processing (e.g., encrypting and/or decrypting) authorization request tokens and/or identification tokens.

The authorization request token may be created by third party device 240 based on a parameter. In some implementations, the parameter may include a request parameter (e.g., a parameter used to process the authorization request token and/or to generate and process an identification token, as will be discussed below). In some implementations, the parameter may include a third party parameter (e.g., a parameter that the entity, associated with third party device 240, desires to have passed through the authentication process, such as for the entity's own use).

In some implementations, the authorization request token may be created based on an authorization request object that includes a character string representing a set of name-value pairs, each of which may correspond to a parameter (e.g., to a request parameter or to a third party parameter). For example, each parameter may be represented as a name-value pair that includes a parameter name and a value associated with the parameter name (e.g., "name":"value"). In some implementations, the authorization request object may be a JavaScript object notation (JSON) web token (JWT), as defined in "JSON Web Token (JWT)," RFC 7519, May 2015, and the OpenID Connect Core 1.0 specification ("Final: OpenID Connect Core 1.0 incorporating errata set 1," hereinafter "OpenID Connect Core 1.0").

In some implementations, the request parameters may include issuer, audience, response type, third party identifier, scope, state, session identifier, and/or session expiration time. The request parameter "issuer" may identify the entity creating the authorization request token (e.g., third party device 240, in which case the request parameter "issuer" would correspond to the third party identifier). The request parameter "audience" may identify the entity (e.g., authorization device 235) that is to authenticate mobile device 205 based on the authorization request token. The request parameter "response type" may define what type of response should be made to the authorization request, including what tokens should be created and/or included in the response to the authorization request. For example, the response type request parameter may indicate that an identification token and/or an access token should be sent to mobile device 205 and/or to third party device 240. The request parameter "third party identifier" may be the third party identifier that identifies third party device 240. The request parameter "scope" may indicate a type of authorization request (e.g., whether an authorization request based on the authorization request token is an OpenID Connect request, as defined in OpenID Connect Core 1.0).

The request parameter "state" may be used to maintain a state between the authorization request token and any associated callbacks. The request parameter "session identifier" may include a session identifier created, by third party device 240, to identify a particular authentication session (e.g., for authentication of mobile device 205). In some implementations, the session identifier may be specific to a particular third party application. The request parameter "session expiration time" may include a session expiration time, created by third party device 240, to indicate a time after which session information (e.g., data generated, used, and/or processed in connection with the authentication session that is identified by the session identifier, such as the session identifier, the identification object, and/or the identification token) is no longer considered to be valid.

In some implementations, the authorization request parameters may include a callback URL (e.g., a "redirect_uri" as defined in OpenID Connect Core 1.0, which specifies an address (e.g., an IP address) to which a response should be sent). The callback URL may include an address (e.g., an IP address for third party device 240) to which a response to the authentication request may be sent in the authentication process. As will be more fully discussed below, the presence or absence of a callback URL in the authorization request object may determine a particular authentication flow that third party device 240, mobile device 205, and/or authorization device 235 may use to authenticate mobile device 205.

The third party parameters may include parameters that a third party (e.g., a third party associated with third party device 240) desires to have passed through the authentication process (e.g., without being changed during the authentication process), such as for use by the third party. For example, the third party may have existing processes that operate based on certain parameters, which may be unique to the third party.

In some implementations, the third party parameters may be designated as such in the authorization request object such that authorization device 235 may identify third party parameters in a decrypted authorization request token. For example, third party device 240 may add one or more characters (e.g., letters, numbers, and/or symbols) or character strings to the name of some parameters included in the authorization request object to indicate that such parameters are third party parameters. In some implementations, third party device 240 may prepend one or more characters (e.g., "x_" or "x.") to the names of some parameters included in the authorization request object to indicate that such parameters are third party parameters. For example, a parameter having a name-value pair of example=1234 may be included in the authorization request object as x_example=1234 (e.g., "x_example":"1234" if the authorization request object is a JSON web token) to indicate that example=1234 is a third party parameter.

In some implementations, at least some of the third party parameters included in the authorization request object may be designated to receive a secure treatment (e.g., encryption and/or being sent using a secured session). For example, third party device 240 may indicate that some third party parameters should receive secure treatment by adding one or more additional characters (e.g., letters, numbers, and/or symbols) or character strings to the names of some of the third party parameters included in the authorization request object. In some implementations, third party device 240 may add the additional characters to the characters that were prepended to the names of some third party parameters (e.g., adding "s" such that "x_" becomes "xs_" or "x." becomes "xs."). For example, the third party parameter having the name-value pair of example=1234 may be included in the authorization request object as xs_example=1234 (e.g., "xs_example":"1234" if the authorization request object is a JSON web token) to indicate that the third party parameter example=1234 should receive secure treatment.

In some implementations, groups of third party parameters included in the authorization request object may be designated as either third party parameters that do not require security (e.g., public parameters) or third party parameters that should receive a secure treatment (e.g., private parameters). For example, if the authorization request object is a JSON web token, the name-value pair "3Ppub":{"pub_ex1":"1234", "pub_ex2":"4567"} may indicate that pub_ex1=1234 and pub_ex2=4567 are third party parameters that do not require security, while the name-value pair "3Ppri":{"pri_ex1":"2345", "pri_ex2": "3456"} may indicate that pri_ex1=2345 and pri_ex2=3456 are third party parameters that should receive a secure treatment.

The authorization request object may be encrypted by third party device 240 to create the authorization request token. For example, third party device 240 may assemble the parameters (e.g., the request parameters and, if included, the third party parameters) into the authorization request object (e.g., a JSON web token) and then encrypt (e.g., using the security key assigned to third party device 240 for processing authorization request tokens) the authorization request object to create the encrypted authorization request token. In some implementations, the authorization request object may have been signed, by third party device 240, prior to the authorization request object having been encrypted by third party device 240.

Third party device 240 may cause mobile device 205 to send, to authorization device 235, an authorization request based on the authorization request token. In some implementations, when the authorization request object includes a callback URL, third party device 240 may send, to mobile device 205, a redirect response (e.g., an HTTP 302 redirect) that includes the authorization request token. The redirect response may cause mobile device 205 (e.g., by way of a browser or other software on mobile device 205) to send, to authorization device 235, an authorization request based on the authorization request token.

In some implementations, when the authorization request object does not include a callback URL, third party device 240 may send, to mobile device 205, a message (e.g., a JavaScript authorization request) that includes the authorization request token. The message may cause mobile device 205 (e.g., by way of a browser or other software on mobile device 205) to send, to authorization device 235, an authorization request based on the authorization request token.

In some implementations, using an encrypted authorization request token may permit using an unsecured communication pathway (e.g., using HTTP) when sending the authorization request token between third party device 240, mobile device 205, and/or authorization device 235. Using an unsecured communication pathway (e.g., HTTP) may reduce latencies that might be incurred in setting up a secure session (e.g., using HTTPS). In some implementations, the authorization request token may be sent over a secure session (e.g., using HTTPS).

As further shown in FIG. 4, process 400 may include decrypting the authorization request token to obtain the parameter (block 420). For example, authorization device 235 may decrypt (e.g., using the network operator's security key for processing authorization request tokens) the authorization request token and obtain the parameter from the decrypted authorization request token.

In some implementations, where the authorization request token was signed by third party device 240, authorization device 235 may verify the signature of the authorization request token, which may authenticate the authorization request token as having been created by third party device 240.

Authorization device 235 may obtain the parameter from the decrypted authorization request token. For example, authorization device 235 may obtain the third party identifier, the session identifier, the session expiration time, and/or the callback URL (if included in the authorization request object).

In some implementations, authorization device 235 may validate the request parameters obtained from the decrypted authorization request token. For example, authorization device 235 may compare the third party identifier obtained from the decrypted authorization request token to the third party identifier that was assigned to third party device 240. In some implementations, authorization device 235 may validate the callback URL based on callback URLs that have been received from third party device 240. In some implementations, authorization device 235 may evaluate the session expiration time obtained from the decrypted authorization request token to determine that the session expiration time has not expired.

In some implementations, authorization device 235 may identify some of the parameters obtained from the decrypted authorization request token as being third party parameters. When a decrypted authorization request token includes third party parameters, authorization device 235 may pass the third party parameters through the authentication process, including sending the third party parameters to third party device 240 and/or to mobile device 205. For example, authorization device 235 may remove the added characters from the names of third party parameters that are included in the decrypted authorization request token (e.g., x_example=1234) and send the underlying parameter (e.g., example=1234) to third party device 240 and/or to mobile device 205. In some implementations, authorization device 235 may send at least some of the third party parameters to third party device 240 and/or to mobile device 205 in all messages that authorization device 235 sends to third party device 240 and/or to mobile device 205.

As further shown in FIG. 4, process 400 may include determining, based on an address for the mobile device, a mobile device identifier for the mobile device (block 430). For example, authorization device 235 may determine, based on mobile device 205's address (e.g., a network address, such as an IP address), a mobile device identifier (e.g., an MDN, an IMSI, or a TMSI) for mobile device 205.

In some implementations, authorization device 235 may determine the mobile device identifier based on the binding, created by PGW 225, between mobile device 205's address and mobile device 205's mobile device identifier. For example, authorization device 235 may receive the address and port identifier (e.g., port name or port number) for a current network attachment of mobile device 205 (e.g., based on the address and port from which authorization device 235 received the authorization request token) and then determine the mobile device identifier based on the binding between the address and the mobile device identifier. In some implementations, authorization device 235 may obtain the mobile device identifier from a query of an appropriate data structure (e.g., a pilot packet database) based on the address for mobile device 205.

As further shown in FIG. 4, process 400 may include creating an identification token for the mobile device based on the mobile device identifier and the parameter (block 440). For example, authorization device 235 may create an identification token for mobile device 205 based on the mobile device identifier for mobile device 205 and the parameter obtained from the decrypted authorization request token.

The identification token may be created based on an identification object that includes a character string representing a set of name-value pairs. Each of the name-value pairs may include a name and a value associated with the name (e.g., "name":"value"). In some implementations, the identification object may be a JSON web token (as described above).

In some implementations, the identification object may include a mobile device identifier (e.g., MDN, IMSI, and/or TMSI) for mobile device 205 and a parameter. In some implementations, parameters included in the identification object may include the issuer (e.g., an identifier for authorization device 235, such as a URL), the audience (e.g., third party device 240), a time at which authorization device 235 issued the identification object, a time at which authorization device 235 authenticated mobile device 205, a session identifier, and/or a session expiration time. In some implementations, the audience may be specified in the identification object by way of the third party identifier. In some implementations, the session identifier and session expiration time included in the identification object may have been obtained from the decrypted authorization request token.

In some implementations, the identification object may include one or more third party parameters that have been passed through the authentication process after having been included in the authorization request object, as described above. For example, authorization device 235 may identify a third party parameter in the decrypted authorization request token based on the one or more characters or character strings that third party device 240 added to the names of third party parameters in the authorization request object. In some implementations, authorization device 235 may remove the one or more characters or character strings from the names of the third party parameters to be included in the identification object. For example, authorization device 235 may remove the prepended characters (e.g., "x_") from the parameter having the name-value pair of x_example=1234 in the authorization request object. The underlying third party parameter, example=1234, may then be included in the identification object (e.g., as "example": "1234" if the identification object is a JSON web token).

In some implementations, authorization device 235 may sign the identification object to create the identification token. In some implementations, authorization device 235 may encrypt the identification object to create the identification token. In some implementations, authorization device 235 may encrypt the identification object to create the identification token when the identification object includes one or more third party parameters that were designated, in the authorization request object, as needing secure treatment. In some implementations, authorization device 235 may sign and encrypt the identification object to create the identification token.

In some implementations, authorization device 235 may evaluate the parameters obtained from the decrypted authorization request token (e.g., the response type parameter) and determine that authorization device 235 should create an access token. In some implementations, authorization device 235 may create an access token, for third party device 240, if the request parameters (e.g., the third party identifier) indicate that third party device 240 is authorized to receive additional information regarding mobile device 205 and/or a user of mobile device 205.

In some implementations, authorization device 235 may store (e.g., in a cache memory) session information (e.g., data generated, used, and/or processed in connection with the authentication session that is identified by the session identifier). In some implementations, the session information may include the session identifier, the identification object, and/or the identification token. In some implementations, where an access token was created, authorization device 235 may store the access token. In some implementations, authorization device 235 may store the session identifier, the identification object, the identification token, and/or the access token until the session expiration time has been reached. In some implementations, the session identifier may be associated with the session information until the session expiration time has been reached.

As further shown in FIG. 4, process 400 may include sending the identification token to at least one of the mobile device or the third party device (block 450). For example, authorization device 235 may send the identification token to mobile device 205 and/or to third party device 240.

In some implementations, security for the identification token (e.g., when sending the identification token to mobile device 205 and/or third party device 240) may be a function of the communication method used in a given situation. For example, when the identification token is sent over an unsecured communication pathway (e.g., via an HTTP 302 redirect or an HTTP 200 OK response), the identification token may be encrypted (e.g., using the network operator's security key for processing identification tokens). Alternatively, when the identification token is sent using a secured communication session (e.g., using HTTPS), the identification token may optionally be sent without having been encrypted, or the identification token may be encrypted before sending.

Authorization device 235 may evaluate the request parameters obtained from the decrypted authorization request token and determine where and how to send the identification token. In some implementations, authorization device 235 may determine where and how to send the identification token based on whether the authorization request parameters include a callback URL request parameter.

In some implementations (e.g., where the request parameters include a callback URL request parameter), authorization device 235 may obtain the callback URL for third party device 240 from the decrypted authorization request token (e.g., from the request parameters). In some implementations, authorization device 235 may encrypt the identification token, which may permit the identification token to be securely sent, to mobile device 205 and third party device 240, using an unsecured communication pathway (e.g., HTTP). If an access token was created, authorization device 235 may also encrypt the access token (e.g., when encrypting the identification token).

Authorization device 235 may send, to mobile device 205, a redirect message (e.g., an HTTP 302 redirect) to the callback URL for third party device 240, with the redirect message including the encrypted identification token. In some implementations, the redirect message may include the access token (e.g., when authorization device 235 created the access token).

After receiving, from authorization device 235, the redirect to the callback URL for third party device 240, mobile device 205 may send the encrypted identification token to third party device 240. In some implementations where mobile device 205 received the access token from authorization device 235, mobile device 205 may additionally send the access token to third party device 240.

In some implementations (e.g., where the request parameters do not include a callback URL request parameter), authorization device 235 may send, to mobile device 205, a response (e.g., an HTTP 200 OK) indicating that authentication of mobile device 205 was successful. The response, which may be unencrypted, may include the session identifier and optionally at least some of the third party parameters from the decrypted authorization request token. For example, the response may include third party parameters for which security is not required and/or which have been have designated as public. In some implementations, when at least some of the third party parameters have been designated to receive secure treatment, the response may be sent using a secured communication session (e.g., using HTTPS) and/or at least some of the third party parameters may be encrypted.

In some implementations, mobile device 205 may send, to third party device 240, a request including the session identifier. In some implementations, the request may be unencrypted and may additionally include at least some of the third party parameters (e.g., the third party parameters for which security is not required and/or which have been have designated as public). In some implementations, when at least some of the third party parameters have been designated to receive secure treatment, the request may be sent using a secured communication session (e.g., using HTTPS) and/or at least some of the third party parameters may be encrypted.

Third party device 240 may send, to authorization device 235, a request that authorization device 235 send, to third party device 240, the identification token for mobile device 205. In some implementations, the request may include the third party identifier (e.g., as assigned to third party device 240), the third party secret (e.g., as assigned to third party device 240), a redirect URL (e.g., the IP address to which authorization device 235 should send the identification token (e.g., to third party device 240)), the session identifier, and/or the session expiration time. In some implementations, the request may be sent using a secured communication session (e.g., HTTPS). In some implementations, the request may be encrypted.

Based on the request received from third party device 240, authorization device 235 may send the identification token to third party device 240. In some implementations, authorization device 235 may send the identification token to third party device 240 using a secured communication session (e.g., HTTPS), without encrypting the identification token. In some implementations, authorization device 235 may encrypt the identification token prior to sending the identification token to third party device 240. In some implementations, where an access token was created, authorization device 235 may additionally send the access token to third party device 240. In some implementations, authorization device 235 may retrieve the identification token and/or the access token from a storage location (e.g., from a cache memory where the tokens may have been stored during the current session).

In some implementations, authorization device 235 may, prior to sending the identification token to third party device 240, authenticate third party device 240, validate the session identifier, and/or determine that the session has not expired. In some implementations, authorization device 235 may authenticate third party device 240 based on the third party identifier and/or the third party secret. For example, authorization device 235 may compare the third party identifier and/or third party secret, received from third party device 240 in the request for the identification token, to the third party identifier and/or third party secret that were assigned to third party device 240. In some implementations, authorization device 235 may validate the session identifier when the session identifier in the request for the identification token matches the session identifier that was stored by authorization device 235 (as discussed above with regard to block 440) or when the session identifier is not expired.

After receiving the identification token from authorization device 235, third party device 240 may obtain, from the identification token, the mobile device identifier, other parameters (e.g., session identifier and session expiration time), and third party parameters (e.g., when third party parameters were included in the authorization request object and the identification token). In some implementations, third party device 240 may decrypt (e.g., using the security key assigned to third party device 240 for processing identification tokens) the identification token. In some implementations, where the identification token was signed, third party device 240 may verify the signature (e.g., verify that the signature is associated with authorization device 235).

Third party device 240 may authenticate mobile device 205 based on the mobile device identifier obtained from the identification token. In some implementations, after authenticating mobile device 205, third party device 240 may respond to the resource request that was received from mobile device 205.

In some implementations, where third party device 240 received an access token, third party device 240 may obtain additional information based on the access token. For example, authorization device 235 may evaluate the access token and determine that third party device 240 may have authorization to access additional information associated with the authenticated mobile device 205 (e.g., information beyond the mobile device identifier, such as authorized subscriber information). In some implementations, authorization device 235 may send, to third party device 240, information regarding the subscriber associated with mobile device 205 (e.g., the MDN for mobile device 205, the subscriber's name and/or user name, the subscriber's email address, an image associated with the subscriber, etc.).

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Implementations described herein may enable secure communications for a mobile device authentication process, with reduced use of secure communication sessions (e.g., HTTPS sessions). Authenticating mobile devices with reduced use of secure communication sessions may reduce latencies associated with mobile device authentication and may, additionally or alternatively, reduce consumption of network resources that would otherwise be used to set up secure communications sessions (e.g., HTTPS sessions). In some implementations, third party parameters may be passed through the authentication process, with optionally available security, which may allow third parties to more easily integrate the authentication services into the third parties' offerings because the third parties may selectively pass the third parties' parameters through the authentication process.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
   a memory storing instructions; and
   one or more processors to execute the instructions to:
      receive an encrypted authorization request token from a mobile device over an unsecured communication pathway,
         the encrypted authorization request token being based on at least one third party parameter, and
         the encrypted authorization request token having been created by a third party device based on a request from the mobile device;
      decrypt the encrypted authorization request token to obtain the at least one third party parameter,
         the at least one third party parameter including a parameter name, and
         the parameter name including at least one added character;
      remove the at least one added character from the parameter name;
      determine, based on an address for the mobile device, a mobile device identifier for the mobile device;
      create, based on removing the at least one added character from the parameter name, an identification token for the mobile device,
         the identification token being based on the mobile device identifier, a callback uniform resource locator (URL), and the at least one third party parameter; and
      send a redirect to the callback URL, that includes the identification token, to the mobile device to permit the third party device to authenticate the mobile device.

2. The device of claim 1, where the request is a first request;
   where the at least one third party parameter includes a first session identifier;
   where the one or more processors are further to:
      receive, from the third party device, a second request for the identification token,
         the second request including a second session identifier; and
      validate the second session identifier based on the first session identifier; and
   where the one or more processors, when sending the redirect to the callback URL, that includes the identification token, to the mobile device, are to:
      send the redirect to the callback URL, that includes the identification token, to the third party device based on the second request and based on validating the second session identifier.

3. The device of claim 1, where the one or more processors when sending the redirect to the callback URL, that includes the identification token, to the mobile device, are to:
   send the redirect to the callback URL, that includes the identification token, to the third party device using a secured communication session.

4. The device of claim 1, where the callback URL includes an Internet Protocol (IP) address for the third party device.

5. The device of claim 3, where the secured communication session includes a secure session based on a hypertext transfer protocol (HTTP) within a connection encrypted by a transport layer security (TLS) or secure sockets layer (SSL).

6. The device of claim 1, where the one or more processors are further to:
   encrypt the identification token before sending the identification token to the mobile device.

7. The device of claim 1, where the one or more processors are further to:
   validate, based on decrypting the encrypted authorization request token, the at least one third party parameter; and
   where the one or more processors, when determining the mobile device identifier, are to:
      determine, based on validating the at least one third party parameter, the mobile device identifier.

8. The device of claim 6, where the encrypted identification token is decrypted by the third party device to obtain the mobile device identifier.

9. The device of claim 1, where the identification token is sent to the third party device based on the redirect to the callback URL.

10. A non-transitory computer-readable medium storing instructions, the instructions comprising:
   one or more instructions that, when executed by one or more processors, cause the one or more processors to:
      receive, from a mobile device, an encrypted authorization request token over an unsecured communication pathway,
         the encrypted authorization request token having been created and encrypted by a third party device based on a request from the mobile device;
      decrypt the encrypted authorization request token to obtain a decrypted authorization request token,
         the decrypted authorization request token including at least one third parameter,
         the at least one third parameter including a parameter name, and the parameter name including at least one added
character;
remove the at least one added character from the
parameter name;
determine, based on an address for the mobile device,
a mobile device identifier for the mobile device;
create, based on removing the at least one added
character from the parameter name, an identification
token for the mobile device,
the identification token being based on the mobile
device identifier, a callback uniform resource
locator (URL), and the at least one third parameter; and
send a redirect to the callback URL, that includes the
identification token, to the mobile device to permit
the third party device to authenticate the mobile
device.

11. The non-transitory computer-readable medium of claim 10, where the one or more instructions, when executed by the one or more processors, further cause the one or more processors to:
encrypt the identification token; and
where the one or more instructions, that cause the one or more processors to send the redirect to the callback URL, that includes the identification token, to the mobile device, cause the one or more processors to:
send the redirect to the callback URL, that includes the identification token, after encrypting the identification token, to the mobile device over the unsecured communication pathway.

12. The non-transitory computer-readable medium of claim 10, where the one or more instructions, when executed by the one or more processors, further cause the one or more processors to:
create an access token,
the access token including authorization to access authorized subscriber information;
and
where the one or more instructions, that cause the one or more processors to send the redirect to the callback URL, that includes the identification token, to the mobile device, cause the one or more processors to:
send the redirect to the callback URL, that includes the identification token and the access token, to the mobile device.

13. The non-transitory computer-readable medium of claim 10, where the request is a first request;
where the one or more instructions, when executed by the one or more processors, further cause the one or more processors to:
receive, from the third party device, a second request for the identification token,
the second request being received through a first secured communication session; and
where the one or more instructions, that cause the one or more processors to send the redirect to the callback URL, that includes the identification token, to the mobile device, cause the one or more processors to:
send the redirect to the callback URL, that includes the identification token, to the third party device using a second secured communication session.

14. The non-transitory computer-readable medium of claim 10, where the one or more instructions, that cause the one or more processors to receive the encrypted authorization request token, cause the one or more processors to:
receive the encrypted authorization request token based on a hypertext transfer protocol (HTTP) redirect from the third party device.

15. The non-transitory computer-readable medium of claim 10, where the one or more instructions, when executed by the one or more processors, further cause the one or more processors to:
assign, to the third party device, one or more security keys; and
where the one or more instructions, that cause the one or more processors to decrypt the encrypted authorization request token, cause the one or more processors to:
decrypt, using the one or more security keys, the encrypted authorization request token.

16. A method, comprising:
receiving, by an authorization device and from a mobile device over an unsecured communication pathway, an encrypted authorization request token created based on at least one third party parameter,
the encrypted authorization request token having been encrypted, by a third party device, and received, by the mobile device, from the third party device based on a request from the mobile device;
decrypting, by the authorization device, the encrypted authorization request token to obtain the at least one third party parameter,
the at least one third party parameter including a parameter name, and
the parameter name including at least one added character;
removing, by the authorization device, the at least one added character from the parameter name;
determining, by the authorization device, a mobile device identifier for the mobile device,
the mobile device identifier being determined based on a network address for the mobile device;
creating, by the authorization device and based on removing the at least one added character from the parameter name, an identification token for the mobile device,
the identification token being created based on the mobile device identifier, a callback uniform resource locator (URL), and the at least one third party parameter; and
sending, by the authorization device, a redirect to the callback URL, that includes the identification token, to the mobile device to permit the third party device to authenticate the mobile device.

17. The method of claim 16, where the unsecured communication pathway is a first unsecured communication pathway;
where the method further comprises:
encrypting the identification token; and
where sending the redirect to the callback URL, that includes the identification token, to the mobile device comprises:
sending the redirect to the callback URL, that includes the identification token, after encrypting the identification token, to the mobile device using a second unsecured communication pathway.

18. The method of claim 16, further comprising:
sending the identification token to the third party device using a secured communication session.

19. The method of claim 16,
where the method further comprises:
encrypting the identification token before sending the identification token to the mobile device.

20. The method of claim 16, further comprising:
obtaining the callback URL from a request parameter; and
where sending the redirect to the callback URL, that includes the identification token, to the mobile device comprises:
sending the redirect to the callback URL, that includes the identification token, to the mobile device based on obtaining the callback URL from the request parameter.

* * * * *